United States Patent
Zhou et al.

(10) Patent No.: US 9,265,060 B1
(45) Date of Patent: Feb. 16, 2016

(54) METHOD OF SCHEDULING COMMUNICATION IN A WIRELESS COMMUNICATION NETWORK

(71) Applicant: Sprint Spectrum LP, Overland Park, KS (US)

(72) Inventors: Yu Zhou, Herndon, VA (US); Chunmei Liu, Great Falls, VA (US); Muhammad Naim, Sterling, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 149 days.

(21) Appl. No.: 14/207,134

(22) Filed: Mar. 12, 2014

(51) Int. Cl.
*H04W 80/04* (2009.01)
*H04W 88/06* (2009.01)
*H04W 28/04* (2009.01)
*H04W 72/04* (2009.01)
*H04W 36/18* (2009.01)
*H04W 72/12* (2009.01)
*H04W 36/30* (2009.01)

(52) U.S. Cl.
CPC .......... *H04W 72/1257* (2013.01); *H04W 36/30* (2013.01)

(58) Field of Classification Search
CPC ..... H04W 80/04; H04W 88/06; H04W 28/04; H04W 72/04; H04W 36/18
USPC .......................................... 370/328, 329, 331
See application file for complete search history.

(56) References Cited

U.S. PATENT DOCUMENTS

| | | | |
|---|---|---|---|
| 2011/0117967 A1* | 5/2011 | Vedantham et al. | 455/561 |
| 2013/0142175 A1 | 6/2013 | Manssour et al. | |
| 2013/0170396 A1 | 7/2013 | Dinan | |
| 2014/0269565 A1* | 9/2014 | Chou | 370/329 |

* cited by examiner

*Primary Examiner* — Ronald B Abelson

(57) ABSTRACT

A system and method of scheduling communication in a wireless communication network are provided. An access node can determine a scheduling scheme based on an indication of data addressed to wireless devices. The scheduling scheme can comprise a first subframe and a second subframe comprising a first and second resource block. The scheduling scheme can be communicated. Data addressed to the wireless devices in communication with a first access node can be transmitted during the first subframe and the first resource block of the second subframe. A second access node can be instructed to assign data addressed to wireless devices that meet a signal condition threshold to be transmitted during the second resource block of the second subframe and to assign data addressed to wireless devices that do not meet the signal condition threshold to be transmitted during the first subframe and the first resource block of the second subframe.

18 Claims, 6 Drawing Sheets

METHOD OF SCHEDULING COMMUNICATION IN A WIRELESS COMMUNICATION NETWORK

TECHNICAL BACKGROUND

Wireless communication can be used as a means of accessing a communication network. Wireless communication has certain advantages over wired communications. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Various types of network configurations can be used to communicate data over the wireless network. For example, a heterogeneous network can be configured to include various types of access nodes such as a macro access node, a micro access node, a pico access node, a femto access node, etc. In a heterogeneous network, a wireless device can be served by an access node having the lowest signal path loss rather than by an access node having the strongest signal strength as in traditional network configurations.

In a heterogeneous network, interference can occur at the cell edge of the short range, low power access nodes due to the macro access node. This interference can result in undesirable reduction in coverage and throughput to the wireless devices in communication with the short range access node. A scheduling scheme comprising an almost blank subframe (ABS) can be used to create an opportunity for the wireless devices within the cell edge region of a short range access node to receive downlink information without interference from the macro access node. However, the capacity of a macro access node can be reduced due to the increase in ABSs in a scheduling scheme.

Overview

A system and method of scheduling communication in a wireless communication network are provided. A first access node can determine a scheduling scheme based on a first indication of data addressed to wireless devices in communication with the first access node and a second indication of data addressed to wireless devices in communication with a second access node. The scheduling scheme can comprise a first subframe and a second subframe where the second subframe comprises a first resource block and a second resource block. The scheduling scheme can be communicated from the first access node to the second access node. Data addressed to the wireless devices in communication with the first access node can be transmitted during the first subframe and the first resource block of the second subframe. The first access node can refrain from transmitting data addressed to the wireless devices in communication with the first access node during the second resource block of the second subframe. The second access node can be instructed to assign data addressed to wireless devices in communication with the second access node that meet a signal condition threshold to be transmitted during the second resource block of the second subframe of the scheduling scheme and to assign data addressed to wireless devices in communication with the second access node that do not meet the signal condition threshold to be transmitted during the first subframe and the first resource block of the second subframe of the scheduling scheme.

DETAILED DESCRIPTION

Figure 1:
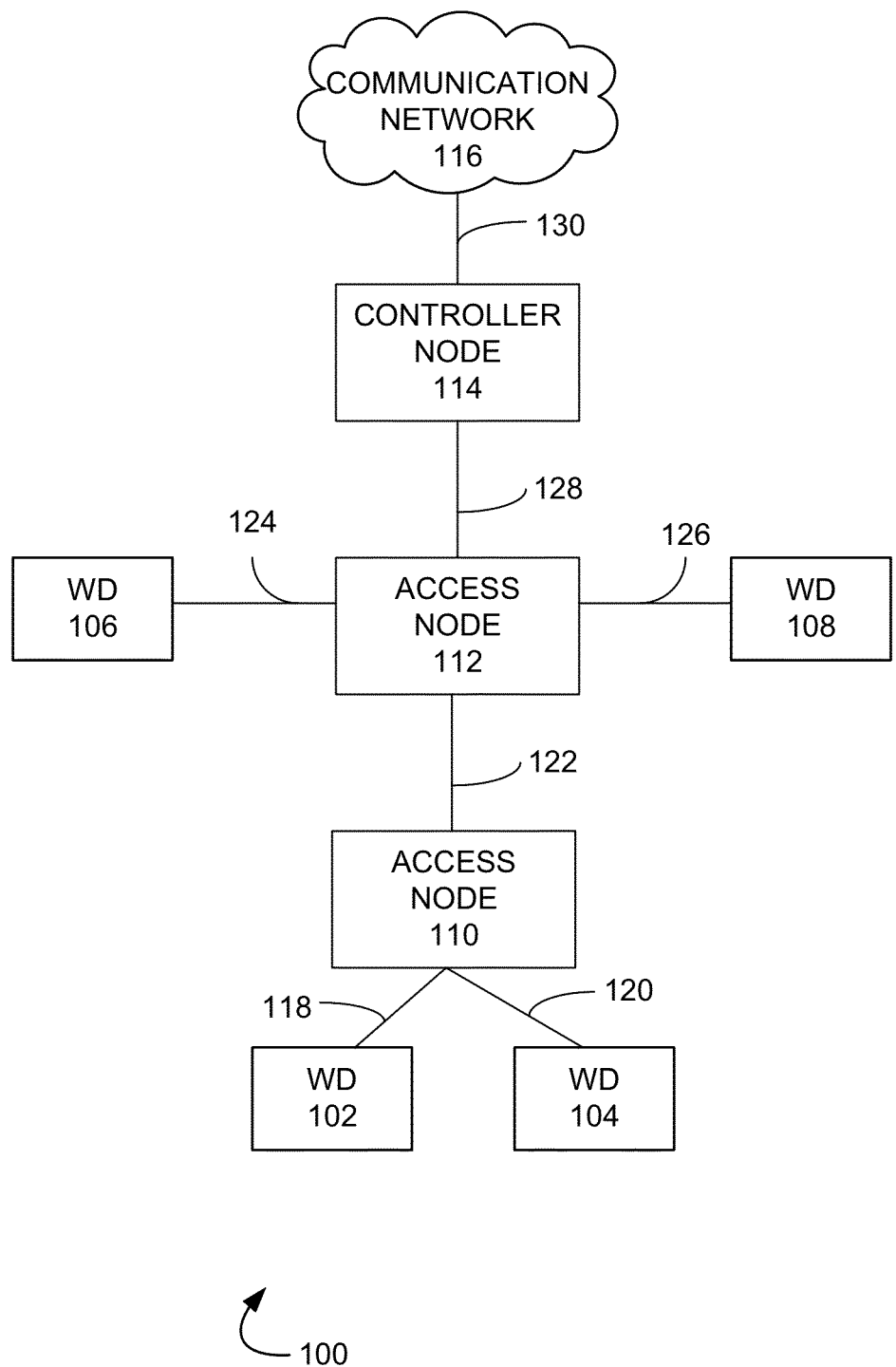
FIG. 1 illustrates a communication system to schedule communications in a wireless communication network.

FIG. 1 illustrates an exemplary communication system 100 for scheduling communication in a wireless communication network. Communication system 100 can comprise wireless devices 102, 104, 106, 108, access nodes 110, 112, controller node 114, and a communication network 116. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 110, 112 and communication network 116, which are omitted for clarity, including additional processing nodes, routers, gateways, and physical and/or wireless data links for carrying data among the various network elements.

Wireless devices 102, 104, 106, 108 can be any device configured to communicate over communication system 100 using a wireless interface. For example, wireless devices 102, 104, 106, 108 can include a remote terminal unit, a cell phone, a smart phone, a computing platform such as a laptop, palmtop, or a tablet, a personal digital assistant, or an internet access device, and combinations thereof. It is noted that while FIG. 1 illustrates two wireless devices in communication with each access node 110, 112 any number of wireless devices can be implemented according to various exemplary embodiments disclosed herein.

The wireless interface of wireless devices 102, 104, 106, 108 can include one or more transceivers for transmitting and receiving data over communication system 100. Each transceiver can be associated with the same or different frequency bands, the same or different radio access technologies, the same or different network providers, and/or the same or different services. For example, wireless devices 102, 104, 106, 108 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 110 through communication link 118. Wireless device 104 can be in communication with access node 110 through communication link 120. Wireless device 106 can be in communication with access node 112 through communication link 124. Wireless device 108 can be in communication with access node 112 through communication link 126. Links 118, 120, 124, 126 can use various communication media, such as air, space, metal, optical fiber, or some other signal propagation path—including combinations thereof. Communication links 118, 120, 124, 126 may comprise many different signals sharing the same link. Communication links 118, 120, 124, 126 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 110 could share the same representative wireless link, but be transferred over different communication sessions, frequencies, timeslots, packets, ports, sockets, logical transport links, or in different directions—including combinations thereof.

Wireless devices 102, 104, 106, 108 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 110, 112 can be any network node configured to provide communication between wireless devices 102, 104, 106, 108 and communication network 116. Access nodes 110, 112 can be standard access nodes and/or short range, low power access nodes. In an exemplary embodiment, access node 110 can be a short range, low power access node within at least a portion of an overlapping coverage area of access node 112, where access node 112 can be a standard access node. A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while two access nodes 110, 112 are illustrated in FIG. 1, any number of access nodes can be implemented within system 100.

Access nodes 110, 112 can comprise a processor and associated circuitry to execute or direct the execution of computer-readable instructions to obtain information. Access nodes 110, 112 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 112 can receive instructions and other input at a user interface.

Controller node 114 can be any network node configured to communicate information and/or control information over system 100. For ease of illustration, controller node 114 is shown in FIG. 1 to be in communication with access node 112 through communication link 128. However, one of ordinary skill in the art would recognize that controller node 114 can also be in communication with access node 110. Controller node 114 can be a standalone computing device, computing system, or network component, and can be accessible, for example, by a wired or wireless connection, or through an indirect connection such as through a computer network or communication network. For example, controller node 114 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 114 is not limited to any specific technology architecture, such as Long Term Evolution (LTE) and can be used with any network architecture and/or protocol.

Controller node 114 can comprise a processor and associated circuitry to execute or direct the execution of computer-readable instructions to obtain information. Controller node 114 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 114 can receive instructions and other input at a user interface.

Access node 110 can be in communication with access node 112 through communication link 122. Access node 112 can be in communication with controller node 114 through communication link 128. Controller node 114 can be in communication with communication network 116 through communication link 130. Communication links 122, 128, 130 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 1122, 128, 130 can be a direct link or might include various equipment, intermediate components, systems, and networks.

Communication network 116 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 116 can be capable of carrying data, for example, to support voice, push-to-talk, broadcast video, and data communications by a wireless device such as wireless device 102. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 116 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 116 can also comprise additional base stations, controller nodes, telephony switches, internet routers, network gateways, computer systems, communication links, or some other type of communication equipment, and combinations thereof.

In operation, a network node, such as access node 112 and/or controller node 114 can determine a scheduling scheme based on a first indication of data addressed to wireless devices 106, 108 in communication with access node 112 and a second indication of data addressed to wireless devices 102, 104 in communication with a second access node such as access node 110. The scheduling scheme can comprise a first subframe and a second subframe. In addition, the second subframe can comprise a first resource block and a second resource block. The scheduling scheme can be communicated to access node 110. Data addressed to the wireless devices 106, 108 in communication with access node 112 can be transmitted during the first subframe and the first resource block of the second subframe. Access node 112 can refrain from transmitting data addressed to wireless devices 106, 108 during the second resource block of the second subframe. Access node 110 can be instructed to assign data addressed to wireless devices that meet a signal condition threshold to be transmitted during the second resource block of the second subframe of the scheduling scheme. In addition, access node 110 can further be instructed to assign data addressed to wireless devices in communication with access node 110 that do not meet the signal condition threshold to be transmitted during the first subframe and the first resource block of the second subframe of the scheduling scheme.

The scheduling scheme can comprise 0-N first subframes and 0-N second subframes provided that the combination of number of subframes equals N. For example, in LTE N equals ten subframes per frame. The scheduling scheme of one frame can be determined to comprise a combination of 0-10 first subframes and 0-10 second subframes. In an exemplary embodiment, when no wireless device within the cell edge region requires resources to transmit uplink data, the number of second subframes can be selected to be 0 and the frame can be configured to include 10 first subframes.

Figure 2:
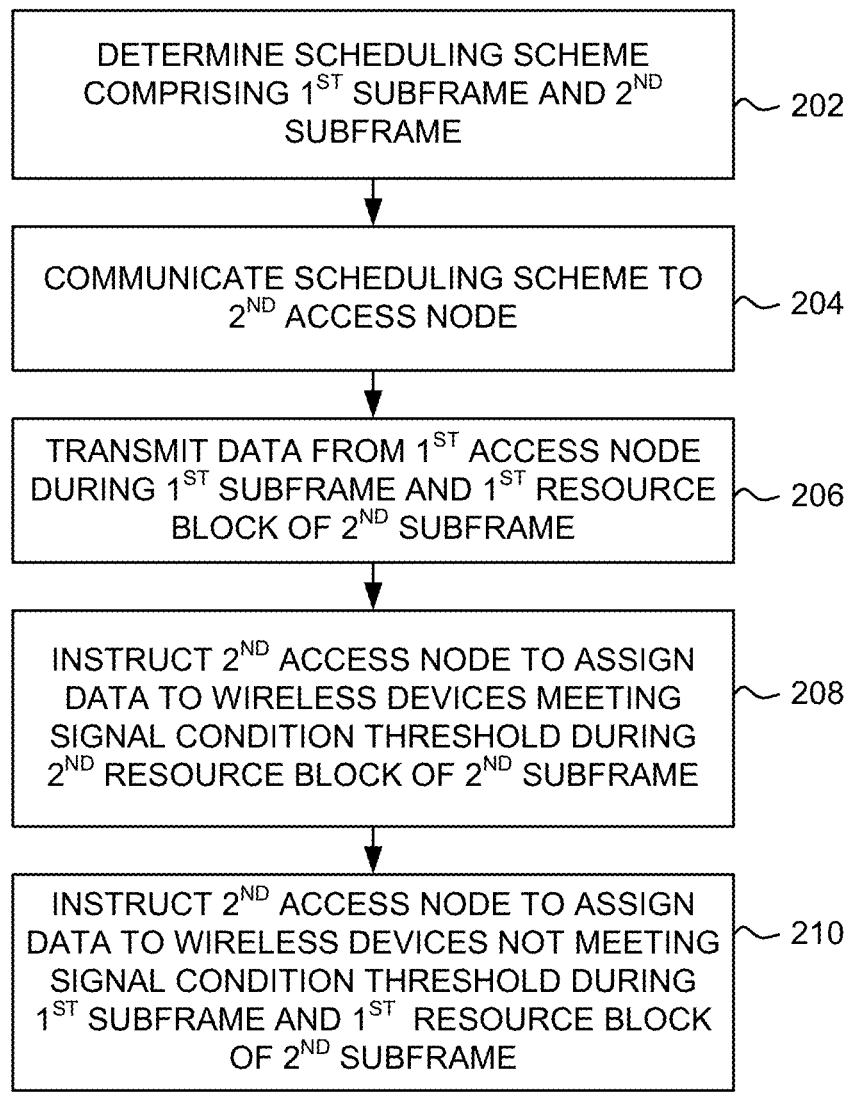
FIG. 2 illustrates an exemplary method of scheduling communication in a wireless communication network.

FIG. 2 illustrates a flow chart of an exemplary method of scheduling communication in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, a network node can determine a scheduling scheme comprising a first subframe and a second subframe. For example, access node 112 and/or controller node 114 can determine the scheduling scheme. A scheduling scheme can be any scheme associated with scheduling resources for an access node to be in communication with a wireless device. A scheduling scheme can comprise a plurality of frames and each frame can comprise a plurality of subframes where the plurality of subframes comprises 0-N first subframes and 0-N second subframes. Each subframe can comprise a plurality of resource elements. The number of first subframes and second subframes determined within the scheduling scheme can be based on various factors such as the amount of information to be sent in the downlink to wireless devices in communication with each access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul of system 100, a throughput of each network node, a processing load at each network node, and any delay associated with each network node.

In an exemplary embodiment, the scheduling scheme can be further determined based on a signal condition of wireless devices in communication with access nodes 110, 112. For example, wireless devices in communication with access node 110 can experience interference from access node 112 if they are located in the cell edge of access node 110. Therefore, a signal condition of the wireless devices in communication with access nodes 110, 112 can be determined prior to determining the scheduling scheme. The signal condition can be indicative of a signal quality and/or signal strength and be based on a signal characteristic. For example, the signal condition can be based on at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR).

After the signal characteristic associated with each wireless device is classified as meeting the signal condition (e.g. the wireless device is located at the cell edge of the associated access node) and not meeting the signal condition (e.g. the wireless device is not located at the cell edge of the associated access node), the network node can determine the scheduling scheme. In an exemplary embodiment, when data addressed to a wireless device, such as wireless device 102, 104, exceeds a threshold amount and the wireless device is determined to be located at the cell edge of the associated access node, the scheduling scheme associated with access node 112 can comprise a greater number of resource blocks in which access node 112 refrains from transmitting data addressed to wireless devices 106, 108.

The scheduling scheme can be communicated to a second access node at 204. For example, after controller node 114 and/or access node 112 determines the scheduling scheme for access nodes 110, 112 to communicate with wireless devices 102, 104, 106, 108, respectively, the scheduling scheme can be communicated to access node 110.

At 206, data can be transmitted from a first access node to wireless devices in communication with the first access node during the first subframe of the scheduling scheme and the first resource block of the second subframe. In addition, data can be prevented from being transmitted from the first access node during a second resource block of the second subframe of the scheduling scheme. For example, access node 112 can transmit data addressed to wireless devices 106, 108 during the first subframe of the scheduling scheme and the first resource block of the second subframe. Access node 112 can then refrain from transmitting data addressed to wireless devices 106, 108 during a second resource block of the second subframe of the scheduling scheme.

The smallest scheduling allocation increment can be a resource block rather than a subframe. Each subframe can comprise a plurality of resource blocks and the number of resource blocks available per subframe can be based on the bandwidth of the system. In an exemplary embodiment, one subframe can be divided into several resource block groups where each group comprises a plurality of resource blocks. In another exemplary embodiment, each resource block can be considered a resource block group.

The second access node can be instructed to assign data to wireless devices meeting signal condition threshold during the second resource block of the second subframe at 208 and to assign data to wireless devices not meeting signal condition threshold during the first subframe and the first resource block of the second subframe at 210. For example, access node 112 and/or controller node 114 can instruct access node 110 to transmit data addressed to wireless devices at the cell edge during the second resource block of the second subframe (e.g. when access node 112 is not transmitting data to wireless devices 106, 108) and to transmit data addressed to wireless devices not at the cell edge during the first subframe and the first resource block of the second subframe of the scheduling scheme.

In an exemplary embodiment, a bitmap message can be used to communicate the scheduling scheme to access node 110 and/or instruct access node 110 how to assign data to wireless devices that meet the signal condition and that do not meet the signal condition. The bitmap message can comprise an indication of which resource blocks and/or resource block groups access node 112 will refrain from transmitting data addressed to wireless devices 106, 108.

Figure 3:
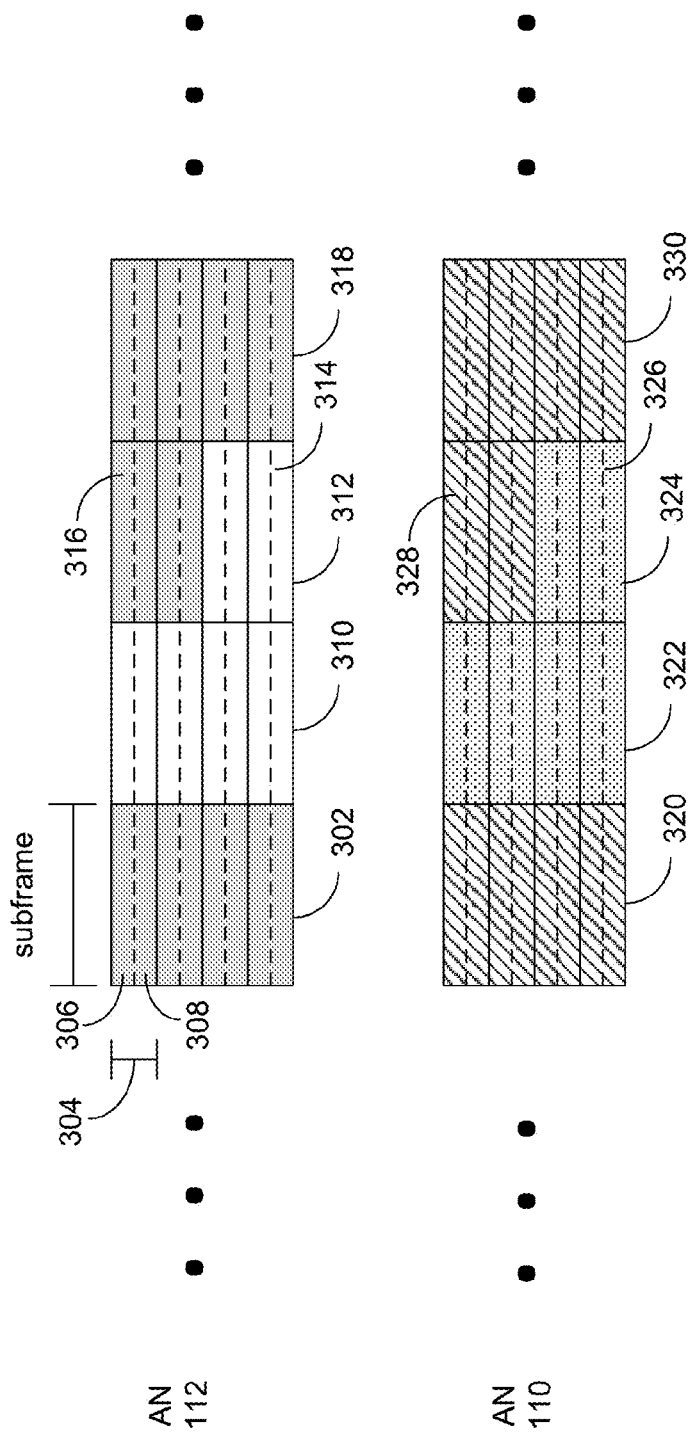
FIG. 3 illustrates an exemplary scheduling scheme for scheduling communication in a wireless communication network.

FIG. 3 illustrates an exemplary scheduling scheme for scheduling communication in a network. The scheduling scheme can comprise any number of subframes and each subframe can comprise any number of resource blocks. The scheduling scheme can be based on various factors including the amount of information to be sent in the downlink to wireless devices in communication with each access node, a load on each access node, a load on the network, an application requirement of an application running on a wireless device in communication with an access node, etc. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul, a throughput of each network node, a processing load at each network node, and any delay associated with each network node.

In an exemplary embodiment, each subframe can comprise a plurality of resource block groups having a plurality of resource blocks. For example, as illustrated in FIG. 3, subframe 302 comprises a resource block group 304 where resource block group 304 comprises resource blocks 306, 308. For ease of illustration, FIG. 3 illustrates four resource groups having two resource blocks each however the scheduling scheme can have any number of resource block groups and each group can comprise any number of resource blocks. In an alternative embodiment, each resource block can be a resource block group.

The scheduling scheme associated with access node 112 can comprise subframes 302, 310, 312, 318. Subframes 302, 318, and resource blocks 316 (illustrated as shaded regions) can represent when access node 112 transmits data addressed to wireless devices 106, 108. Subframe 310 and resource blocks 314 can represent when access node 112 refrains from transmitting data addressed to wireless devices 106, 108 to allow wireless devices located in the cell edge of access node 110 to receive data without interference. The scheduling scheme associated with access node 110 can comprise subframes 320, 322, 324, 330. Subframes 320, 330 and resource blocks 328 can represent when access node 110 transmits data addressed to wireless devices that do not meet a signal condition (e.g. not located in the cell edge of access node 110). Subframe 322 and resource blocks 326 can represent when access node 110 transmits data addressed to wireless devices that meet a signal condition (e.g. located in the cell edge of access node 110).

In an exemplary embodiment, the resource blocks in which access node 112 refrains from transmitting data to wireless devices 106, 108 can be determined based on the amount of information to be sent in the downlink to wireless devices in communication with each access node, a load on each access node, a load on the network, an application requirement of an application running on a wireless device in communication with an access node, etc. For example, when the amount of information addressed to wireless devices located at the cell edge of access node 110 increases, the amount of resource blocks allocated can be increased. In addition, resource blocks can be allocated such that resource blocks in a single subframe are selected before subframes of an adjacent subframe are allotted. For example, as illustrated in FIG. 3, six resource block groups are determined in the scheduling scheme however each subframe comprises four resource block groups. Rather than select three resource groups in subframe 310 and three resource groups in subframe 312, the resource block groups of subframe 310 can be allocated first (4 resource block groups) and the excess resource groups less than a full subframe are allocated in an adjacent subframe 312. While FIG. 3 illustrates that the excess resource groups are selected in an adjacent subframe 312, the excess resource groups can be allocated in a non-adjacent subframe, such as subframe 318.

In another exemplary embodiment, access node 112 and/or controller node 114 can instruct access node 110 to assign data to wireless devices based on the signal condition and the scheduling scheme where the instruction is sent as a bitmap message. The bitmap message can utilize bits that are associated with transmission resource blocks and non-transmission resource blocks of access node 112. For example, the bitmap message for the scheduling scheme illustrated in FIG. 3 could be 01(11)1(01)0 where the first bit 0 can be indicative of no resource block groups associated with the non-transmission of data from access node 112, the second part of the message 1(11) can be indicative of resource groups associated with the non-transmission of data from access node 112 where 1 represents that there are resource blocks in subframe 310 associated with non-transmission and (11) can be indicative of the highest resource block group in subframe 310 associated with the non-transmission of data from access node 112. In the next part of the message 1(01), the 1 can represent that there are resource blocks in subframe 312 associated with non-transmission and (01) can represent that the highest resource block group in subframe 312 associated with non-transmission of data from access node 112. Finally, the last 0 can be indicative of no resource block groups associated with non-transmission of data from access node 112 during subframe 318. When a subframe comprises four resource block groups, the bits representative of the highest resource block associated with the non-transmission of data can be represented as follows: the first resource group (00), the second resource group (01), the third resource group (10), and the fourth resource group (11). When the subframe bit is 0, then its corresponding highest resource group indication can be skipped.

Figure 4:
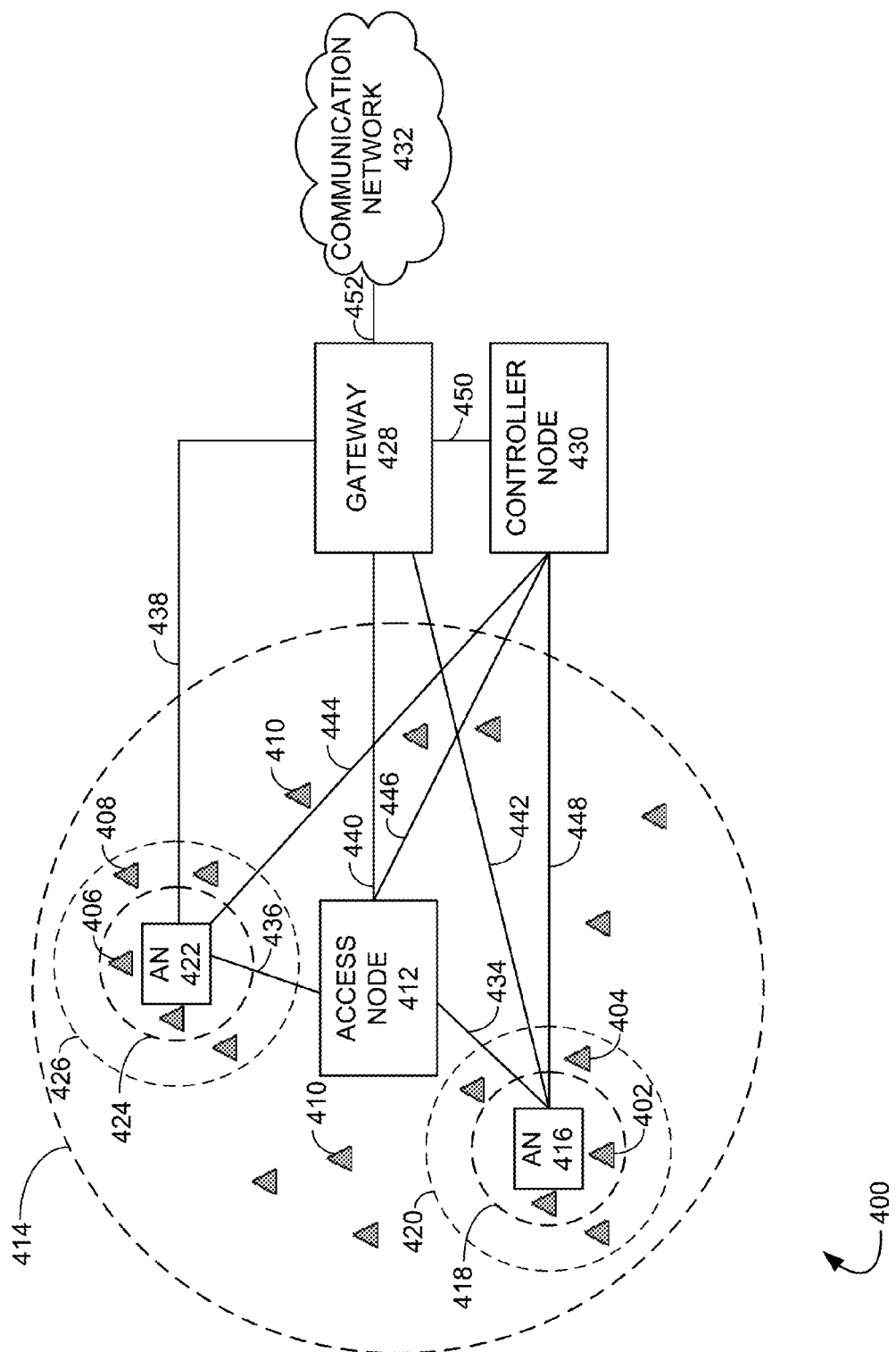
FIG. 4 illustrates another communication system to schedule communications in a wireless communication network.

FIG. 4 illustrates an exemplary communication system 400 for scheduling communication in a wireless communication network. Communication system 400 can comprise wireless devices 402, 404, 406, 408, 410, access nodes 412, 416, 422, gateway 428, controller node 430, and communication network 432. Other network elements may be present in the communication system 400 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access nodes 412, 416, 422 and communication network 432, which are omitted for clarity, including additional processing nodes, routers, gateways, and physical and/or wireless data links for carrying data among the various network elements.

Wireless devices 402, 404, 406, 408, 410 can be any device configured to communicate over communication system 400 using a wireless interface. For example, wireless devices 402, 404, 406, 408, 410 can include a remote terminal unit, a cell phone, a smart phone, a computing platform such as a laptop, palmtop, or a tablet, a personal digital assistant, or an internet access device, and combinations thereof.

The wireless interface of wireless devices 402, 404, 406, 408, 410 can include one or more transceivers for transmitting and receiving data over communication system 400. Each transceiver can be associated with the same or different frequency bands, the same or different radio access technologies, the same or different network providers, and/or the same or different services. For example, wireless devices 402, 404, 406, 408, 410 can include a transceiver that is associated with one or more of the following: code division multiple access (CDMA), global system for mobile communications (GSM), worldwide interoperability for microwave access (WiMAX), long-term evolution (LTE), nd/or high-speed downlink packet access (HSDPA), IEEE 802.11, wireless fidelity (WiFi), Bluetooth, Zigbee, infrared data association (IrDA), multimedia broadcast multicast service (MBMS), etc.

While not illustrated in FIG. 4 for clarity, wireless devices 402, 404 can be in communication with access node 416 through communication links. Wireless devices 406, 408 can be in communication with access node 422 through communication links. Wireless devices 410 can be in communication with access node 412 through communication links. The communication links can use various communication media, such as air, space, metal, optical fiber, or some other signal propagation path—including combinations thereof. The communication links may comprise many different signals sharing the same link. The communication links could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 402 and access node 416 could share the same representative wireless link, but be transferred over different communication sessions, frequencies, timeslots, packets, ports, sockets, logical transport links, or in different directions—including combinations thereof.

Wireless devices 402, 404, 406, 408, 410 can transmit and/or receive information over system 400 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access nodes 412, 416, 422 can be any network node configured to provide communication between wireless devices 402, 404, 406, 408, 410 and communication network 432. Access nodes 412, 416, 422 can be standard access nodes or short range, low power access nodes. In an exemplary embodiment, access node 412 can be a standard access node having a coverage area 414. Access node 416 can be short range, low power access node having a coverage area of 420 and access node 422 can be a short range, low power access node having a coverage area of 426. Access nodes 416, 422 can be within at least a portion of an overlapping coverage area 414 of access node 412 where each access node 416, 422 has a coverage area that includes a cell edge portion between the full strength coverage area 418, 424 and the edge of the cell coverage area 420, 426.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty five kilometers and an output power in the tens of watts. A short range access node can include a microcell access node, a picocell access node, a femtocell access node, or the like such as a home NodeB or a home eNodeB device. In an exemplary embodiment, a microcell access node can have a coverage area of approximately two kilometers and an output power of a few watts. In another exemplary embodiment, a picocell access node can have a coverage area of approximately a half a kilometer and an output power of less than one watt. In yet another exemplary embodiment, a femtocell access node can have a coverage area in the range of 50-200 meters and an output power in the range of 0.5 to 1 watt. Femtocell access nodes can be cellular access nodes or WiFi access nodes. In addition, a wireless device configured to enter a hotspot mode can be a femtocell access node. It is noted that while three access nodes 412, 416, 422 are illustrated in FIG. 4, any number of access nodes can be implemented within system 400.

Access nodes 412, 416, 422 can comprise a processor and associated circuitry to execute or direct the execution of computer-readable instructions to obtain information. Access nodes 412, 416, 422 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 412, 416, 422 can receive instructions and other input at a user interface.

Gateway 428 can be any network node configured to interface with other network nodes using various protocols. Gateway 428 can communicate user data over system 400. Gateway 428 can be a standalone computing device, computing system, or network component, and can be accessible, for example, by a wired or wireless connection, or through an indirect connection such as through a computer network or communication network. For example, gateway 428 can include a serving gateway (SGW) and/or a public data network gateway (PGW), etc. One of ordinary skill in the art would recognize that gateway 428 is not limited to any specific technology architecture, such as Long Term Evolution (LTE) and can be used with any network architecture and/or protocol.

Gateway 428 can comprise a processor and associated circuitry to execute or direct the execution of computer-readable instructions to obtain information. Gateway 428 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 428 can receive instructions and other input at a user interface.

Controller node 430 can be any network node configured to communicate information and/or control information over system 400. Controller node 430 can be configured to transmit control information associated with a handover procedure. Controller node 430 can be a standalone computing device, computing system, or network component, and can be accessible, for example, by a wired or wireless connection, or through an indirect connection such as through a computer network or communication network. For example, controller node 430 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 430 is not limited to any specific technology architecture, such as Long Term Evolution (LTE) and can be used with any network architecture and/or protocol.

Controller node 430 can comprise a processor and associated circuitry to execute or direct the execution of computer-readable instructions to obtain information. Controller node 430 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 430 can receive instructions and other input at a user interface.

Access node 412 can be in communication with access node 416 through communication link 434. Access node 412 can be in communication with access node 422 through communication link 436. Access node 422 can be in communication with gateway 428 through communication link 438. Access node 412 can be in communication with gateway 428 through communication link 440. Access node 416 can be in communication with gateway 428 through communication link 442. Access node 422 can be in communication with controller node 430 through communication link 444. Access node 412 can be in communication with controller node 430 through communication link 446. Access node 416 can be in communication with controller node 430 through communication link 448. Gateway 428 can be in communication with controller node 430 through communication link 450 and with communication network 432 through communication link 452. Communication links 434, 436, 438, 440, 442, 444, 446, 448, 450, 452 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 434, 436, 438, 440, 442, 444, 446, 448, 450, 452 can be a direct link or might include various equipment, intermediate components, systems, and networks.

Communication network 432 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 432 can be capable of carrying data, for example, to support voice, push-to-talk, broadcast video, and data communications by a wireless device such as wireless device 402. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 432 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 432 can also comprise additional base stations, controller nodes, telephony switches, internet routers, network gateways, computer systems, communication links, or some other type of communication equipment, and combinations thereof.

In operation, a network node, such as access node 412 and/or controller node 430 can determine a scheduling scheme based on a first indication of data addressed to wireless devices 410 in communication with access node 412, a second indication of data addressed to wireless devices 402, 404 in communication with a second access node such as access node 416, and a third indication of data addressed to wireless devices 406, 408 in communication with a third access node such as access node 422. The scheduling scheme can comprise a first subframe and a second subframe. In addition, the second subframe can comprise a first resource block and a second resource block. The scheduling scheme can be communicated to access nodes 416, 422. Data addressed to the wireless devices 410 in communication with access node 412 can be transmitted during the first subframe and the first resource block of the second subframe. Access node 412 can refrain from transmitting data addressed to wireless devices 410 during the second resource block of the second subframe. Access nodes 416, 422 can be instructed to assign data addressed to wireless devices that meet a signal condition threshold 404, 408 to be transmitted during the second resource block of the second subframe of the scheduling scheme. In addition, access nodes 416, 422 can further be instructed to assign data addressed to wireless devices 402, 406 in communication with access nodes 416, 422 that do not meet the signal condition threshold to be transmitted during the first subframe and the first resource block of the second subframe of the scheduling scheme. In addition, it can be determined that the data addressed to wireless devices 404, 408 exceeds an allocation threshold and access node 416 and/or 422 can modify the allocation of data addressed to wireless devices 404, 408 such that the modification results in data allocation during the scheduling scheme that does not exceed the allocation threshold. Alternatively, when the data addressed to wireless devices 404, 408 exceeds the allocation threshold, a handover procedure to access node 412 can be initiated.

Figure 5:
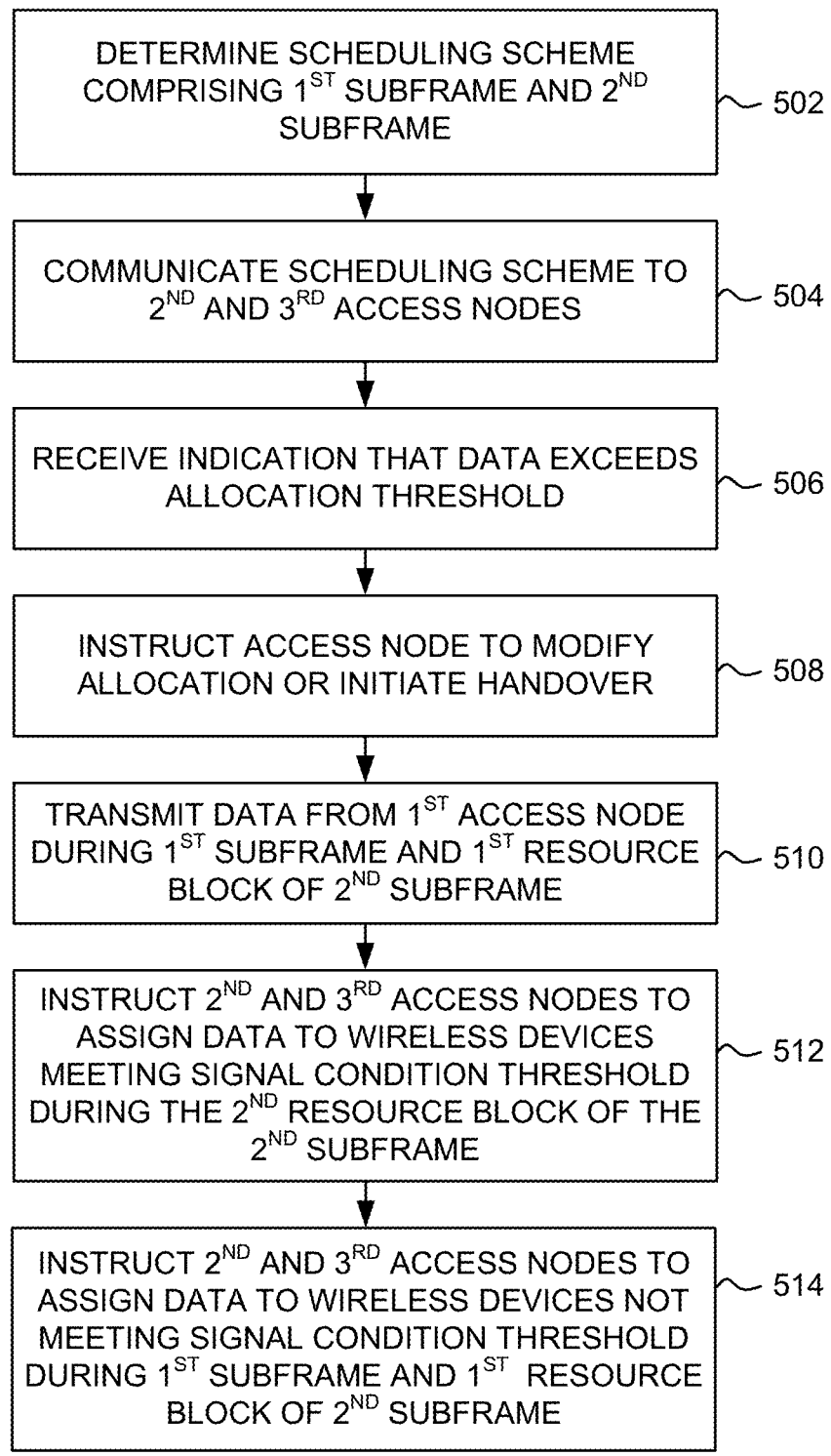
FIG. 5 illustrates another exemplary method of scheduling communication in a wireless communication network.

FIG. 5 illustrates a flow chart of an exemplary method of scheduling communication in a wireless communication network. The method will be discussed with reference to the exemplary communication system 400 illustrated in FIG. 4. However, the method can be implemented with any suitable communication system. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 502, a network node can determine a scheduling scheme comprising a first subframe and a second subframe. For example, access node 412 and/or controller node 430 can determine the scheduling scheme. A scheduling scheme can be any scheme associated with scheduling resources for an access node to be in communication with a wireless device. A scheduling scheme can comprise a plurality of frames and each frame can comprise a plurality of subframes where the plurality of subframes comprises 0-N first subframes and 0-N second subframes. Each subframe can comprise a plurality of resource elements. The number of first subframes and second subframes determined within the scheduling scheme can be based on various factors such as the amount of information to be sent in the downlink to wireless devices in communication with each access node, a load on each access node, a load on the network, and an application requirement of an application running on a wireless device in communication with an access node. The load on each access node can comprise a number of wireless devices in communication with each access node, a total amount of data addressed to all wireless devices in communication with each access node, an amount of uplink and/or downlink traffic associated with each wireless device, the total bandwidth available for scheduling communication at each access node, etc. The load on the network can comprise a total amount of traffic associated with each network node in the backhaul of system 400, a throughput of each network node, a processing load at each network node, and any delay associated with each network node.

In an exemplary embodiment, the scheduling scheme can be further determined based on a signal condition of wireless devices 402, 404, 406, 408, 410 in communication with access nodes 412, 416, 422. For example, wireless devices 404, 408 in communication with access nodes 416, 422 can experience interference from access node 412 because they are located in the cell edge of access nodes 416, 422. Therefore, a signal condition of the wireless devices in communication with access nodes 412, 416, 422 can be determined prior to determining the scheduling scheme. The signal condition can be indicative of a signal quality and/or signal strength and be based on a signal characteristic. For example, the signal condition can be based on at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference ratio (SNIR), and signal to quantization noise ratio (SQNR).

After the signal characteristic associated with each wireless device is classified as meeting the signal condition (e.g. the wireless device is located at the cell edge of the associated access node) and not meeting the signal condition (e.g. the wireless device is not located at the cell edge of the associated access node), the network node can determine the scheduling scheme. In an exemplary embodiment, when data addressed to a wireless device, such as wireless devices 404, 408, exceeds a threshold amount and the wireless device is determined to be located at the cell edge of the associated access node, the scheduling scheme associated with access nodes 416, 422 can comprise a greater number of resource blocks in which access node 412 refrains from transmitting data addressed to wireless devices 412.

The scheduling scheme can be communicated to a second and third access node at 504. For example, after controller node 430 and/or access node 412 determines the scheduling scheme for access nodes 412, 416, 422 to communicate with wireless devices 402, 404, 406, 408, 410, the scheduling scheme can be communicated to access nodes 416, 422.

The second and/or third access node can compare the scheduling scheme to the amount of data addressed to the wireless devices in communication with the second and/or third access node to be allocated. When the amount of data addressed to wireless devices that meet the signal condition threshold (e.g. the wireless devices are in the cell edge of the access node coverage area) exceeds the number of subframes assigned in the scheduling scheme, the second and/or third access node can send and the network node can receive an indication that data addressed to the wireless devices that meet the signal condition threshold exceeds an allocation threshold at 506. For example, access node 416 and/or 422 can determine that the data addressed to wireless device 404 and/or 408 exceeds the allocation threshold because the amount of data addressed to wireless device 404 and/or 408 cannot be fully allocated during the second subframes of the scheduling scheme. Access node 416 and/or 422 can determine that the allocation threshold is exceeded based on various factors. For example, access node 416 and/or 422 can further determine whether applications running on each wireless device that meet the signal condition threshold. For instance, delay sensitive applications can be given higher data allocation priority than non-delay sensitive applications. Access node 416 and/or 422 can rank each wireless device 404 and/or 408 that meets the signal condition threshold based on an amount of data addressed to each wireless device, the modulation and coding scheme associated with each wireless device, an application running on each wireless device, a signal characteristic of each wireless device, etc. Access node 416 and/or 422 can then send a message to access node 412 and/or controller node 430 comprising an indication that data addressed to all wireless devices that meet the signal condition threshold exceeds the allocation threshold.

At 508, the network node can instruct the second access node and/or third access node to modify data allocation or initiate a handover of at least one wireless device. For example, access node 412 and/or controller node 430 can instruct access nodes 416 and/or 422 to modify how the data addressed to wireless devices 404, 408 that meet the signal condition threshold is allotted during the scheduling scheme or to initiate a handover of at least one wireless device 404, 408 to access node 412. In an exemplary embodiment, when an application running on a wireless device 404, 408 that meets the signal condition threshold is a non-delay sensitive application, access node 412 and/or controller node 430 can instruct access node 416 and/or 422 to delay allocation of data addressed to wireless devices 404, 408 until a subsequent frame. In another exemplary embodiment, when a time sensitive application is running on wireless devices 404, 408, access node 412 and/or controller node 430 can instruct access node 416 and/or 422 to initiate handing over any number of wireless devices to access node 412 until the data addressed to wireless devices 404, 408 is reduced below the allocation threshold. Alternatively, access node 412 and/or controller node 430 can instruct access node 416 and/or 422 to initiate handing over any number of wireless devices until the amount of data addressed to wireless devices that meet the signal condition threshold is reduced below the allocation threshold.

The first access node can transmit data during the first subframe and the first resource block of the second subframe of the scheduling scheme at 510. For example, access node 412 can transmit data addressed to wireless devices 410 during the first subframe and the first resource block of the second subframe of the scheduling scheme and not transmit data addressed to wireless devices 410 during the second resource block of the second subframe of the scheduling scheme.

The second and third access nodes can be instructed to assign data addressed to wireless devices in communication with the second and third access nodes that meet a signal condition threshold to be transmitted during the second resource block of the second subframe at 512. The second and third access nodes can further be instructed to assign data addressed to wireless devices that do not meet the signal condition threshold to be transmitted during the first subframe and the first resource block of the second subframe of the scheduling scheme at 514. For example, access node 412 and/or controller node 430 can instruct access nodes 416 and 422 to transmit data addressed to wireless devices 404, 408 at the cell edge during the second resource block of the second subframe (e.g. when access node 412 is not transmitting data to wireless devices 410) and to transmit data addressed to wireless devices not at the cell edge 402, 406 during the first subframe and the first resource block of the second subframe of the scheduling scheme (e.g. when access node 412 is transmitting data to wireless devices 410).

Figure 6:
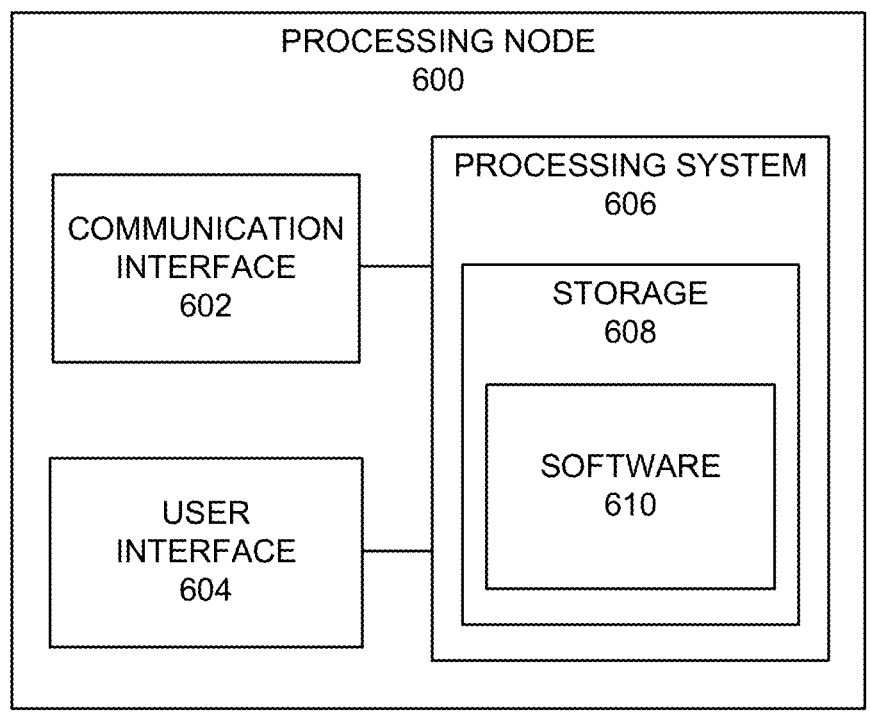
FIG. 6 illustrates a processing node according to an exemplary embodiment.

FIG. 6 illustrates an exemplary processing node 600 in a communication system. Processing node 600 comprises communication interface 602, user interface 604, and processing system 606 in communication with communication interface 602 and user interface 604. Processing node 600 is capable of monitoring communications in a communication network. Processing system 606 includes storage 608, which can comprise a disk drive, flash drive, memory circuitry, or other memory device. Storage 608 can store software 610 which is used in the operation of the processing node 600. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 110, 112, 412, 416, 422, controller nodes 114, 430, and gateway 428. Processing node 600 can also be an adjunct or component of a network element, such as an element of access nodes 110, 112, 412, 416, 422, controller nodes 114, 430, and gateway 428. Processing node 600 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling communication in a wireless communication network, comprising:
  determining at a first access node a scheduling scheme based on a first indication of data addressed to wireless devices in communication with the first access node and a second indication of data addressed to wireless devices in communication with a second access node, wherein the scheduling scheme comprises a first subframe and a second subframe and wherein the second subframe comprises a first resource block group comprising a first resource block and a third resource block and a second resource block group comprising a second resource block and a fourth resource block;
  communicating the scheduling scheme from the first access node to the second access node;
  transmitting data addressed to the wireless devices in communication with the first access node during the first subframe and the first resource block of the second subframe, wherein the first access node does not transmit data addressed to the wireless devices in communication with the first access node during the second resource block of the second subframe; and instructing the second access node to assign data addressed to wireless devices in communication with the second access node that meet a signal condition threshold to be transmitted during the second resource block of the second subframe of the scheduling scheme and to assign data addressed to wireless devices in communication with the second access node that do not meet the signal condition threshold to be transmitted during the first subframe and the first resource block of the second subframe of the scheduling scheme.

2. The method of claim 1, wherein instructing the second access node to assign data addressed to wireless devices that meet the signal condition and data addressed to wireless devices that do not meet the signal condition comprises sending a bitmap message from the first access node to the second access node.

3. The method of claim 2, wherein the bitmap message comprises an indication of a highest resource block of the second subframe to which the second access node should assign data addressed to the wireless devices that meet the signal condition threshold.

4. The method of claim 1, wherein instructing the second access node to assign data addressed to wireless devices that meet the signal condition and data addressed to wireless devices that do not meet the signal condition further comprises sending a bitmap message from the first access node to the second access node wherein the bitmap message comprises an indication expression indicative of a highest resource block group of the second subframe to which the second access node should assign data addressed to the wireless devices that meet the signal condition threshold.

5. The method of claim 1, further comprising
determining at the second access node that the data addressed to the wireless devices that meet the signal condition threshold exceeds an allocation threshold; and
modifying at the second access node the allocation of data addressed to at least one wireless device that meets the signal condition threshold, wherein the modification results in data allocation during the scheduling scheme that does not exceed the allocation threshold.

6. The method of claim 1, further comprising:
determining at the second access node that the data addressed to the wireless devices that meet the signal condition threshold exceeds an allocation threshold; and
initiating a handover procedure of at least one wireless device that meets the signal condition threshold from the second access node to the first access node.

7. The method of claim 6, further comprising:
re-determining the scheduling scheme when the at least one wireless device that meets the signal threshold is in communication with the first access node.

8. The method of claim 1, wherein the wireless devices that meet the signal condition threshold are determined to be in a cell edge region of the second access node.

9. The method of claim 1, wherein the first access node comprises a macro access node and the second access node comprises at least one of a micro access node, a pico access node, and a femto access node.

10. A system of scheduling communication in a wireless communication network comprising:
a processing node configured to
determine a scheduling scheme based on a first indication of data addressed to wireless devices in communication with a first access node and a second indication of data addressed to wireless devices in communication with a second access node, wherein the scheduling scheme comprises a first subframe and a second subframe and wherein the second subframe comprises a first resource block group comprising a first resource block and a third resource block and a second resource block group comprising a second resource block and a fourth resource block,
communicate the scheduling scheme from the first access node to the second access node,
transmit data addressed to the wireless devices in communication with the first access node during the first subframe and the first resource block of the second subframe, wherein the first access node does not transmit data addressed to the wireless devices in communication with the first access node during the second resource block of the second subframe, and
instruct the second access node to assign data addressed to wireless devices in communication with the second access node that meet a signal condition threshold to be transmitted during the second resource block of the second subframe of the scheduling scheme and to assign data addressed to wireless devices in communication with the second access node that do not meet the signal condition threshold to be transmitted during the first subframe and the first resource block of the second subframe of the scheduling scheme.

11. The system of claim 10, wherein instructing the second access node to assign data addressed to wireless devices that meet the signal condition and data addressed to wireless devices that do not meet the signal condition comprises sending a bitmap message from the first access node to the second access node.

12. The system of claim 11, wherein the bitmap message comprises an indication of a highest resource block of the second subframe to which the second access node should assign data addressed to the wireless devices that meet the signal condition threshold.

13. The system of claim 11, wherein instructing the second access node to assign data addressed to wireless devices that meet the signal condition and data addressed to wireless devices that do not meet the signal condition further comprises sending a bitmap message from the first access node to the second access node wherein the bitmap message comprises an indication expression indicative of a highest resource block group of the second subframe to which the second access node should assign data addressed to the wireless devices that meet the signal condition threshold.

14. The system of claim 10, wherein the processing node is further configured to
determine that the data addressed to the wireless devices that meet the signal condition threshold exceeds an allocation threshold; and
modify the allocation of data addressed to at least one wireless device that meets the signal condition threshold, wherein the modification results in data allocation during the scheduling scheme that does not exceed the allocation threshold.

15. The system of claim 10, wherein the processing node is further configured to
determine that the data addressed to the wireless devices that meet the signal condition threshold exceeds an allocation threshold; and
initiate a handover procedure of at least one wireless device that meets the signal condition threshold from the second access node to the first access node.

16. The system of claim 15, wherein the processing node is further configured to
re-determine the scheduling scheme when the at least one wireless device that meets the signal threshold is in communication with the first access node.

17. The system of claim 10, wherein the wireless devices that meet the signal condition threshold are determined to be in a cell edge region of the second access node.

18. The system of claim 10, wherein the first access node comprises a macro access node and the second access node comprises at least one of a micro access node, a pico access node, and a femto access node.

* * * * *